United States Patent
Miller et al.

(10) Patent No.: US 7,382,937 B2
(45) Date of Patent: Jun. 3, 2008

(54) METHOD AND APPARATUS FOR RE-CONSTRUCTING HIGH-RESOLUTION IMAGES

(75) Inventors: Casey L. Miller, Fort Collins, CO (US); James W. Owens, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 824 days.

(21) Appl. No.: 10/383,330

(22) Filed: Mar. 7, 2003

(65) Prior Publication Data

US 2004/0175055 A1 Sep. 9, 2004

(51) Int. Cl.
*G06K 9/36* (2006.01)
(52) U.S. Cl. .................................................. 382/284
(58) Field of Classification Search ................. 382/284
See application file for complete search history.

(56) References Cited

U.S. PATENT DOCUMENTS

| | | | | |
|---|---|---|---|---|
| 4,694,338 A | * | 9/1987 | Tsinberg | 375/240.01 |
| 4,979,037 A | * | 12/1990 | Mizutani et al. | 375/240.21 |
| 5,253,056 A | * | 10/1993 | Puri et al. | 375/240.01 |
| 5,305,104 A | * | 4/1994 | Jensen et al. | 348/473 |
| 5,473,383 A | * | 12/1995 | Sezan et al. | 348/452 |
| 5,621,473 A | * | 4/1997 | Hill | 348/559 |
| 5,862,268 A | | 1/1999 | Boehlke | 382/299 |
| 6,148,027 A | * | 11/2000 | Song et al. | 375/240 |
| 6,453,074 B1 | * | 9/2002 | Zheng | 382/260 |
| 6,466,618 B1 | | 10/2002 | Messing et al. | |
| 6,477,202 B1 | * | 11/2002 | Takeuchi et al. | 375/240.15 |
| 6,647,061 B1 | * | 11/2003 | Panusopone et al. | 375/240.12 |
| 6,683,997 B1 | * | 1/2004 | Yoshio et al. | 382/299 |
| 6,704,358 B1 | * | 3/2004 | Li et al. | 375/240.02 |
| 6,757,435 B2 | * | 6/2004 | Kondo | 382/238 |
| 6,873,655 B2 | * | 3/2005 | Comer et al. | 375/240.11 |
| 6,907,073 B2 | * | 6/2005 | Sawhney et al. | 375/240.14 |
| 6,937,277 B1 | * | 8/2005 | Hattori et al. | 348/304 |
| 2003/0012457 A1 | | 1/2003 | Solecki et al. | |

FOREIGN PATENT DOCUMENTS

JP 2000-115693 4/2000

OTHER PUBLICATIONS

Elad,M. and Feuer A.; "Restoration of a Single Superresolution Image from Several Blurred, . . . Measured Images;" IEEE Transactions on Image Processing; Dec. 12, 1997.
Mateos J., Katsaggelos A., and Molina R.; "Resolution Enhancement of . . . Resoulation Video;" IEEE International Conference on Acoustics, Speech and Signal Processing; Dec. 4, 2000.
Borman, S. and Stevenson, R.; "Spatial Resolution Enhancement of Low-Resolution Image Sequences . . . " Technical Report, University of Notre Dame; Jul. 8, 1998.

* cited by examiner

*Primary Examiner*—Wenpeng Chen
*Assistant Examiner*—Yuzhen Ge (57) ABSTRACT

A method for constructing a high-resolution image includes constructing a second plurality of time-sequential frames having a second resolution from a first plurality of time-sequential frames having a first resolution, the second resolution being lower than the first resolution, and constructing an image from the second plurality of time sequential frames, the image having a resolution that is higher than the second resolution.

15 Claims, 10 Drawing Sheets

| A_1 | B_3 | C_1 | D_3 |
|---|---|---|---|
| E_4 | F_2 | G_4 | H_2 |
| I_1 | J_3 | K_1 | L_3 |
| M_4 | N_2 | O_4 | P_2 |

HRI_5.1

FIG. 3

| A_1 | B_2 | C_1 | D_2 |
|---|---|---|---|
| E_4 | F_3 | G_4 | H_3 |
| I_1 | J_2 | K_1 | L_2 |
| M_4 | N_3 | O_4 | P_3 |

HRI_5

FIG. 4

| E_4 | G_4 |
|---|---|
| M_4 | O_4 |

LR_4.1

| B_3 | D_3 |
|---|---|
| J_3 | L_3 |

LR_3.1

| F_2 | H_2 |
|---|---|
| N_2 | P_2 |

LR_2.1

| A_1 | C_1 |
|---|---|
| I_1 | K_1 |

LR_1.1

| A_9 | B_9 | C_9 | D_9 | E_9 | F_9 |
|---|---|---|---|---|---|
| G_9 | H_9 | I_9 | J_9 | K_9 | L_9 |
| M_9 | N_9 | O_9 | P_9 | Q_9 | R_9 |
| S_9 | T_9 | U_9 | V_9 | W_9 | X_9 |
| Y_9 | Z_9 | AA_9 | BB_9 | CC_9 | DD_9 |
| EE_9 | FF_9 | GG_9 | HH_9 | II_9 | JJ_9 |

HR'_9

...

| A_1 | B_1 | C_1 | D_1 | E_1 | F_1 |
|---|---|---|---|---|---|
| G_1 | H_1 | I_1 | J_1 | K_1 | L_1 |
| M_1 | N_1 | O_1 | P_1 | Q_1 | R_1 |
| S_1 | T_1 | U_1 | V_1 | W_1 | X_1 |
| Y_1 | Z_1 | AA_1 | BB_1 | CC_1 | DD_1 |
| EE_1 | FF_1 | GG_1 | HH_1 | II_1 | JJ_1 |

| H_5 | K_5 |
|---|---|
| Z_5 | CC_5 |

LR'_5

| G_4 | J_4 |
|---|---|
| Y_4 | BB_4 |

LR'_4

| O_9 | R_9 |
|---|---|
| GG_9 | JJ_9 |

LR'_9

| C_3 | F_3 |
|---|---|
| U_3 | X_3 |

LR'_3

| N_8 | Q_8 |
|---|---|
| FF_8 | II_8 |

LR'_8

| B_2 | E_2 |
|---|---|
| T_2 | W_2 |

LR'_2

| M_7 | P_7 |
|---|---|
| EE_7 | HH_7 |

LR'_7

| A_1 | D_1 |
|---|---|
| S_1 | V_1 |

LR'_1

| I_6 | L_6 |
|---|---|
| AA_6 | DD_6 |

| A_1 | B_2 | C_3 | D_1 | E_2 | F_3 |
|-----|-----|-----|-----|-----|-----|
| G_4 | H_5 | I_6 | J_4 | K_5 | L_6 |
| M_7 | N_8 | O_9 | P_7 | Q_8 | R_9 |
| S_1 | T_2 | U_3 | V_1 | W_2 | X_3 |
| Y_4 | Z_5 | AA_6 | BB_4 | CC_5 | DD_6 |
| EE_7 | FF_8 | GG_9 | HH_7 | II_8 | JJ_9 |

HRI'_10

FIG. 8

| G_4 | I_4 | K_4 |
|---|---|---|
| S_4 | U_4 | W_4 |
| EE_4 | GG_4 | II_4 |

LR'_4.1

| H_3 | J_3 | L_3 |
|---|---|---|
| T_3 | V_3 | X_3 |
| FF_3 | HH_3 | JJ_3 |

LR'_3.1

| B_2 | D_2 | F_2 |
|---|---|---|
| N_2 | P_2 | R_2 |
| Z_2 | BB_2 | DD_2 |

LR'_2.1

| A_1 | C_1 | E_1 |
|---|---|---|
| M_1 | O_1 | Q_1 |
| Y_1 | AA_1 | CC_1 |

| F_2 | L_3 | R_2 | X_3 | DD_2 | JJ_3 |
|---|---|---|---|---|---|
| E_1 | K_4 | Q_1 | W_4 | CC_1 | II_4 |
| D_2 | J_3 | P_2 | V_3 | BB_2 | HH_3 |
| C_1 | I_4 | O_1 | U_4 | AA_1 | GG_4 |
| B_2 | H_3 | N_2 | T_3 | Z_2 | FF_3 |
| A_1 | G_4 | M_1 | S_4 | Y_1 | EE_4 |

HRI'_5

METHOD AND APPARATUS FOR RE-CONSTRUCTING HIGH-RESOLUTION IMAGES

BACKGROUND

Digital video cameras may have image sensors that are capable of capturing very high-resolution video frames. However, limited computing resources such as, for example, bus bandwidth, memory, and/or processing speeds may limit the resolution of a video stream or a printable image that is output from a camera. As a result, the quality of the output of video cameras may be unsatisfactory. Therefore, there exists a need for systems and methods that address these and/or other problems associated with digital imaging.

SUMMARY

An embodiment of a method for changing image resolution includes constructing a second plurality of time-sequential frames having a second resolution by down-sampling a first plurality of respective time-sequential frames having a first resolution, and combining the second plurality of time-sequential frames to generate an image.

An embodiment of a system for changing image resolution includes memory for storing a first plurality of pixel values corresponding to a plurality of respective time-sequential frames, and a processor that is programmed to use the first plurality of pixel values to generate a second plurality of pixel values corresponding to an image having a greater resolution than any of the plurality of time-sequential frames.

BRIEF DESCRIPTION OF THE DRAWINGS

Systems and methods for changing image resolution are illustrated by way of example and not limited by the implementations illustrated in the following drawings. The components in the drawings are not necessarily to scale, emphasis instead is placed upon clearly illustrating the principles of the present invention. Moreover, in the drawings, like reference numerals designate corresponding parts throughout the several views.

DETAILED DESCRIPTION

An embodiment of the invention involves cycling through a set of spatially-offset sampling grids to generate a lower-resolution video stream from a higher-resolution video stream. The set of sampling grids are designed to aid in reconstructing higher-resolution images from the lower-resolution video stream.

Figure 1:
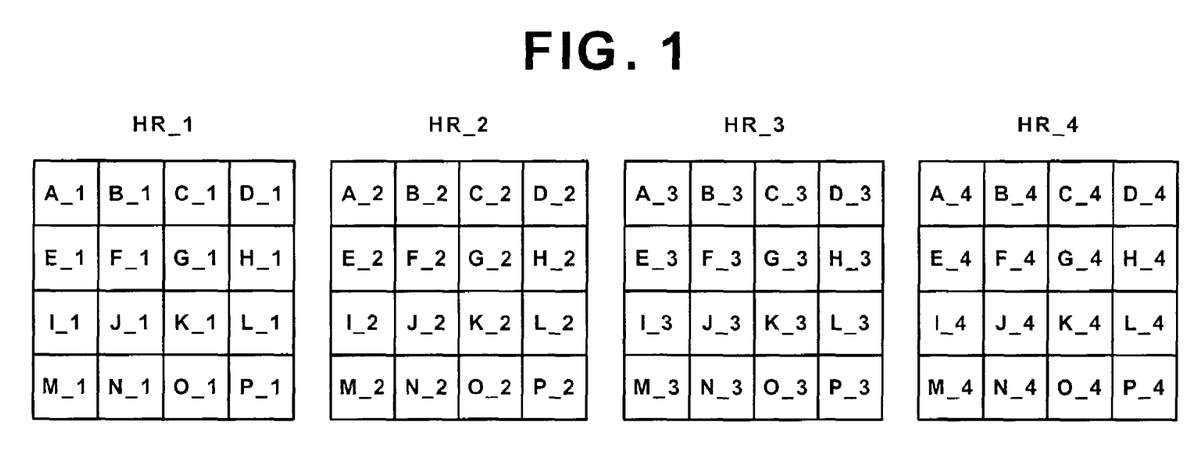
FIG. 1 is a block diagram depicting a simplified example of a sequence of higher-resolution frames.

FIG. 1 is a block diagram depicting a simplified example of a sequence of higher-resolution frames HR_1, HR_2, HR_3, and HR_4. Each higher-resolution frame HR_t (e.g., HR_1, HR_2, HR_3, or HR_4) includes a plurality of pixels A_t, B_t, C_t, ..., P_t. The higher resolution frames can be used to construct lower resolution frames as discussed below. Although, in this simplified example, only 16 pixels per frame are shown, the methodology described herein may be implemented using higher-resolution frames having a greater number of pixels (e.g., thousands or millions of pixels), and such implementations are within the scope of the appended claims.

Figure 2:
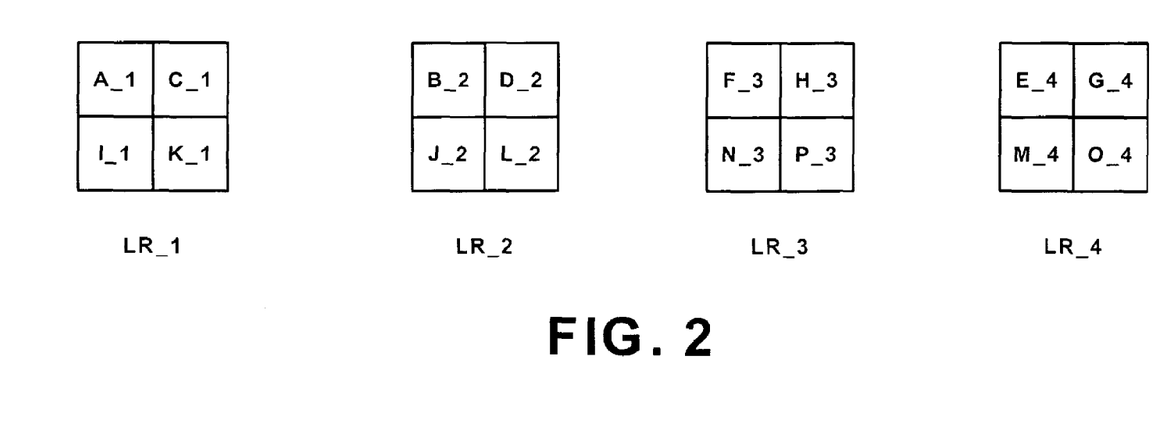
FIG. 2 is a block diagram depicting a sequence of lower-resolution frames that are constructed using the higher resolution frames shown in FIG. 1.

FIG. 2 is a block diagram depicting a sequence of lower-resolution frames LR_1, LR_2, LR_3, and LR_4 that are constructed using the higher resolution frames HR_1, HR_2, HR_3, and HR_4 (FIG. 1), respectively. A certain subset of the pixels of each higher-resolution frame HR_t is used to construct a corresponding lower-resolution frame LR_t. For example, the subset of pixels comprising pixels A_1, C_1, I_1, and K_1 of the higher-resolution frame HR_1 (FIG. 1) may be used to construct the lower-resolution frame LR_1. Similarly, the subset of pixels comprising pixels B_2, D_2, J_2, and L_2 of the frame HR_2 may be used to construct the frame LR_2.

Each pixel in one of the lower-resolution frames LR_1, LR_2, LR_3, and LR_4 is preferably sampled from an inter-frame location in a higher-resolution frame that is different from the inter-frame location from which any of the other pixels in the lower-resolution frames LR_1, LR_2, LR_3, and LR_4 are sampled. In this manner, all inter-frame locations are sampled from the combination of higher-resolution frames HR_1, HR_2, HR_3, and HR_4.

The down-sampling process can be repeated in a similar manner every four frames. The down-sampling method described above could be replaced or supplemented with a filtering process to obtain the lower-resolution frames. For example, the value of each pixel in a lower-resolution frame LR_t may be calculated based on the values of a plurality of neighboring pixels in either a single or a plurality of sequential higher-resolution frames.

The lower-resolution frames LR_1, LR_2, LR_3, and LR_4 may be further filtered and displayed in sequence to produce a lower-resolution video stream. Note that in this example, the number of pixels per frame may be too low to provide a meaningful video stream. However, the concept illustrated in FIGS. 1 and 2 may be extended to larger frames. For example, a stream of 1 mega-pixel frames may be converted to a stream of corresponding 0.25 mega-pixel frames using an embodiment of the invention.

Figure 3:
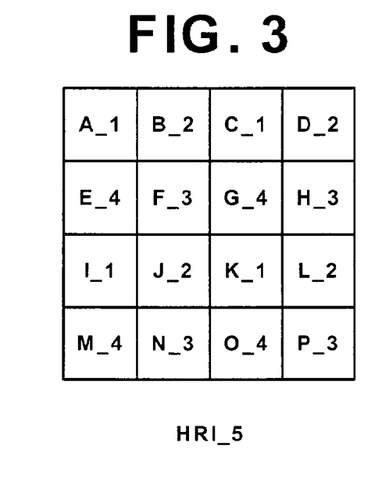
FIG. 3 is a block diagram depicting a higher-resolution image that is constructed using the lower-resolution frames shown in FIG. 2.

FIG. 3 is a block diagram depicting a higher-resolution image HRI_5 that is constructed using lower-resolution frames. The higher-resolution image HRI_5 may be constructed by vertically and horizontally interlacing the lower-resolution frames LR_1, LR_2, LR_3, and LR_4 (FIG. 2). The higher-resolution image HRI_5 may be desired for printing. Alternatively, a sequence of higher-resolution images HRI_t may be filtered and displayed sequentially as a higher-resolution video stream.

There may be artifacts in the higher-resolution image HRI_5 that stem from camera and/or subject motion. However, these artifacts become visually negligible as the number of pixels per corresponding LR_t frame and/or the frequency of corresponding LR_t frames increases. If desired, motion artifacts can be reduced or removed by using image enhancement techniques. For example, the value of each pixel in an enhanced higher-resolution image may be calculated based on the values of a plurality of neighboring pixels in a plurality of sequential lower-resolution images.

One of the embodiments of the invention can be generalized as follows: let each frame X_t of a higher-resolution video stream be represented as a matrix with dimension m×n. Let X_t (r, c) represent the value of the matrix element in row r and column c. In addition, let [a:b:m] represent the sequence of integers a, (a+b), (a+2b), (a+3b), . . . , m. A time-sequence of lower-resolution frames Y_t of size m/2× n/2 can then be derived as follows:

$$Y\_1 = X\_1([1:2:m], [1:2:n]),$$

$$Y\_2 = X\_2([1:2:m], [2:2:n]),$$

$$Y\_3 = X\_3([2:2:m], [2:2:n]),$$

$$Y\_4 = X\_4([2:2:m], [1:2:n]),$$

The down-sampling process can be repeated every four frames such that the relationship between the frames Y_t+4 and X_t+4 can be the same as that between the frames Y_t and X_t.

A higher-resolution image Z_t can be estimated using a time sequence of lower-resolution frames. For example, a higher-resolution image Z_5 of size m×n can be estimated using the lower-resolution frames Y_1, Y_2, Y_3, and Y_4 as follows:

$$Z\_5([1:2:m], [1:2:n]) = Y\_1$$

$$Z\_5([1:2:m], [2:2:n]) = Y\_2$$

$$Z\_5([2:2:m], [2:2:n]) = Y\_3$$

$$Z\_5([2:2:m], [1:2:n]) = Y\_4$$

Figure 4:
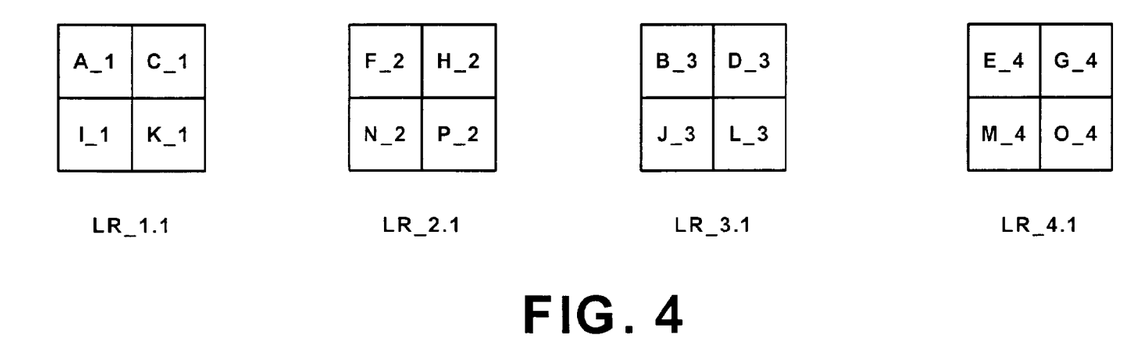
FIG. 4 is a block diagram depicting an alternative embodiment to the sequence of lower-resolution frames depicted in FIG. 2.

FIG. 4 is a block diagram depicting an alternative embodiment to the sequence of lower-resolution frames depicted in FIG. 2. The sampling order used to arrive at the lower-resolution frames LR_1.1, LR_2.1, LR_3.1, and LR_4.1 depicted in FIG. 4 is different than the sampling order used to arrive at the lower-resolution frames LR_1, LR_2, LR_3, and LR_4 depicted in FIG. 2. For example, as shown in FIG. 4, the pixels F_2, H_2, N_2, and P_2 located at (2,2), (2,4), (4,2), and (4,4), respectively higher-resolution frame), are included in frame LR_2.1. In contrast, pixels B_2, D_2, J_2, and L_2, located at (1,2), (1,4), (3,2), and (3,4), respectively, are included in frame LR_2. Many other sampling orders may also be used within the scope of the present invention.

Figure 5:
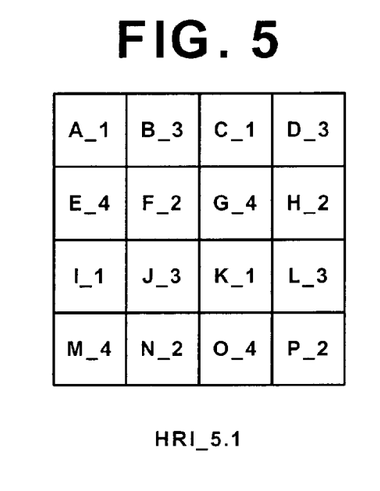
FIG. 5 is a block diagram depicting a higher-resolution image HRI_5.1 that is constructed using the lower-resolution frames depicted in FIG. 4.

FIG. 5 is a block diagram depicting a higher-resolution image HRI_5.1 that is constructed using the lower-resolution frames depicted in FIG. 4. The higher-resolution image HRI_5.1 may be constructed by vertically and horizontally interlacing the lower-resolution frames LR_1.1, LR_2.1, LR_3.1, and LR_4.1 (FIG. 4). Although half of the pixels used in constructing the image HRI_5.1 originate from different respective higher-resolution frames than those used in constructing the image HRI_5 (FIG. 3), both images may appear to be similar, if not identical. The degree of similarity between the images HRI_5 and HRI_5.1 depends on the frame rate and content of the higher-resolution frames HR_1, HR_2, HR_3, and HR_4.

Figure 6:
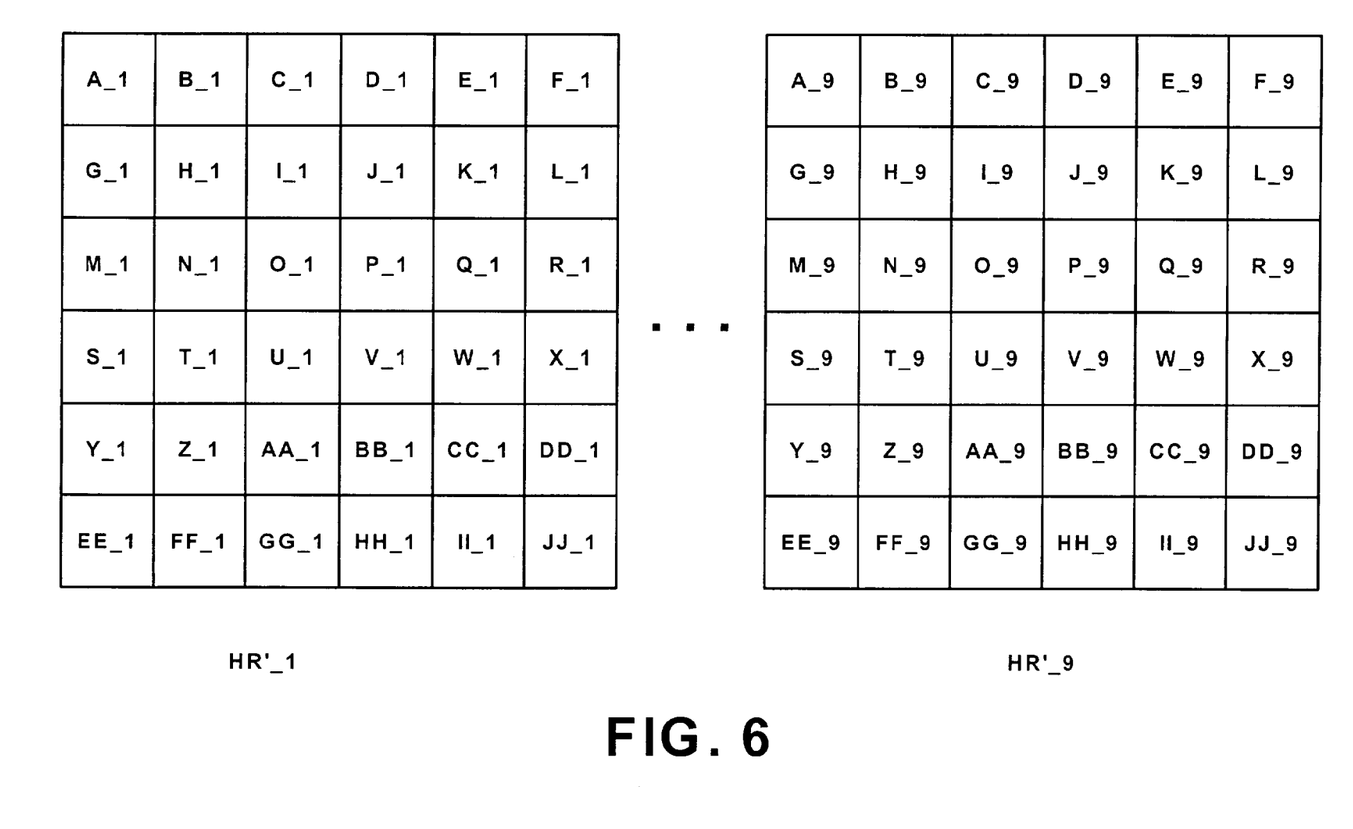
FIG. 6 is a block diagram depicting a simplified example of a sequence of higher-resolution frames.

FIG. 6 is a block diagram depicting a simplified example of a sequence of higher-resolution frames HR'_1, . . . , HR'_9 (including frames HR'_2, . . . , HR'_8 which are not explicitly shown). Each higher-resolution frame HR'_t includes a plurality of pixels A_t, B_t, C_t, . . . , JJ_t. The higher resolution frames HR'_t can be used to construct lower resolution frames as discussed below.

Figure 7:
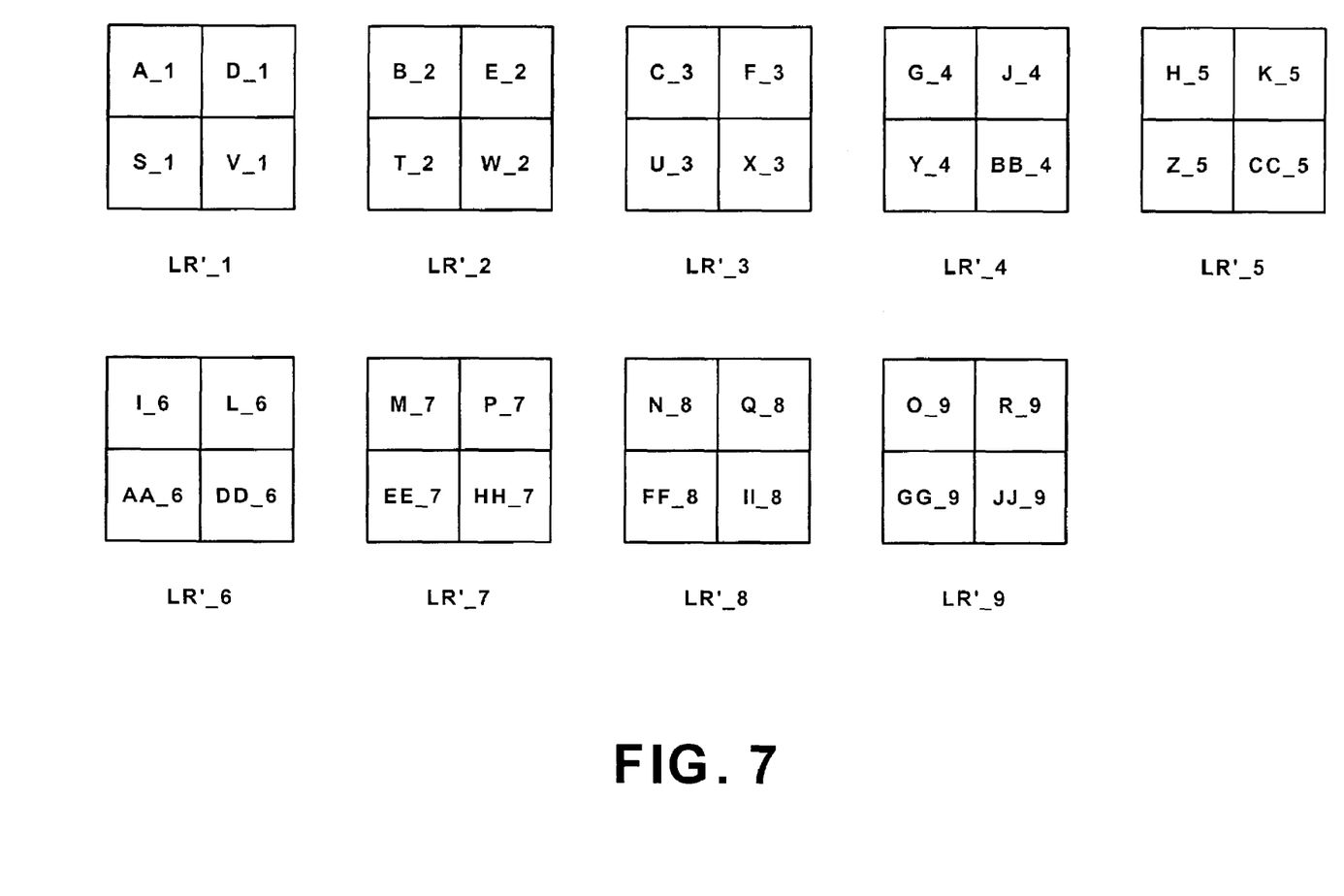
FIG. 7 is a block diagram depicting a sequence of lower-resolution frames that are constructed using the higher resolution frames shown in FIG. 6.

FIG. 7 is a block diagram depicting a sequence of lower-resolution frames LR'_1, . . . , and LR'_9 that are constructed using the higher resolution frames HR'_1, . . . , and HR'_9 (FIG. 6), respectively. A certain subset of the pixels of each higher-resolution frame HR'_t is used to construct a corresponding lower-resolution frame LR'_t. For example, the subset of pixels comprising pixels A_1, D_1, S_1, and V_1 of the higher-resolution frame HR'_1 (FIG. 1) may be used to construct the lower-resolution frame LR'_1. Similarly, the subset of pixels comprising pixels B_2, E_2, T_2, and W_2 of the frame HR'_2 may be used to construct the frame LR'_2. The down-sampling process can be repeated in a similar manner every nine frames.

In an alternative embodiment, the sampling order may be different. As a non-limiting example, the pixels $B_{b\_1}$, E_1, T_1, and W_1 of the frame HR'_1 may be used to construct the frame LR'_1, and the pixels A_2, D_2, S_2, and V_2 of the higher-resolution frame HR'_1 (FIG. 1) may be used to construct the lower-resolution frame LR'_2.

Note that each lower-resolution frame LR'_t contains only ⅑ of the number of pixels of a corresponding higher-resolution frame HR'_t. Therefore, in order for the resolution and quality of a sequence of LR'_t frames to be acceptable, the resolution and/or frame rate of a corresponding sequence of HR' frames must be sufficiently high.

Figure 8:
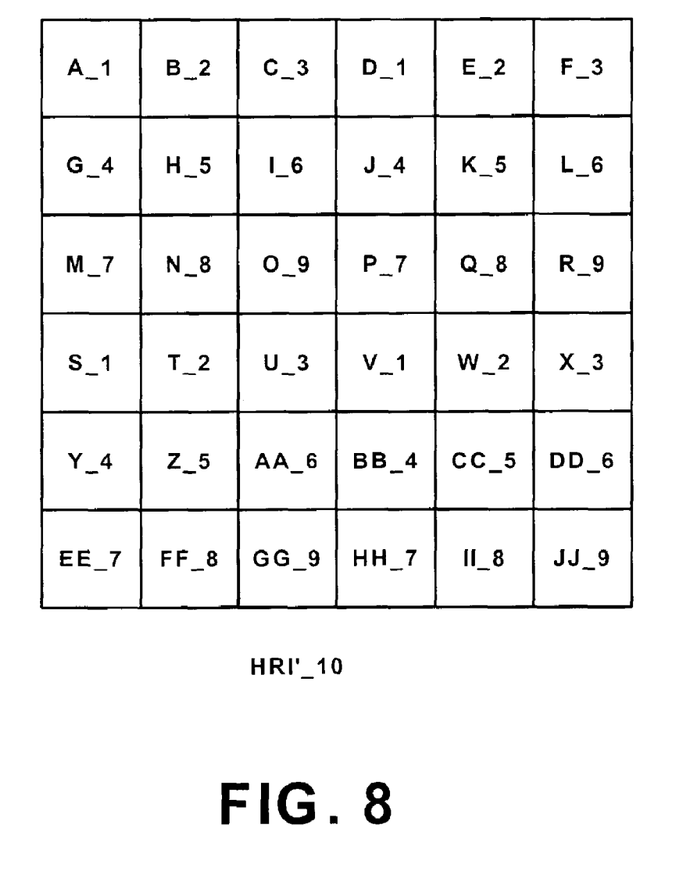
FIG. 8 is a block diagram depicting a higher-resolution image that is constructed using lower-resolution frames shown in FIG. 7.

FIG. 8 is a block diagram depicting a higher-resolution image HRI'_10 that is constructed using lower-resolution frames shown in FIG. 7. The higher-resolution image HRI'_10 may be constructed by vertically and horizontally interlacing the lower-resolution frames LR'_1 . . . LR'_9 (FIG. 7). The lower-resolution frames LR'_1 . . . LR'_9 may be combined such that each pixel from the lower resolution frames LR'_1 . . . LR'_9 is placed within the image HRI'_10 at an inter-frame location that is identical to the pixel's original inter-frame location within a high resolution frame HR'_t (FIG. 6).

Figure 9:
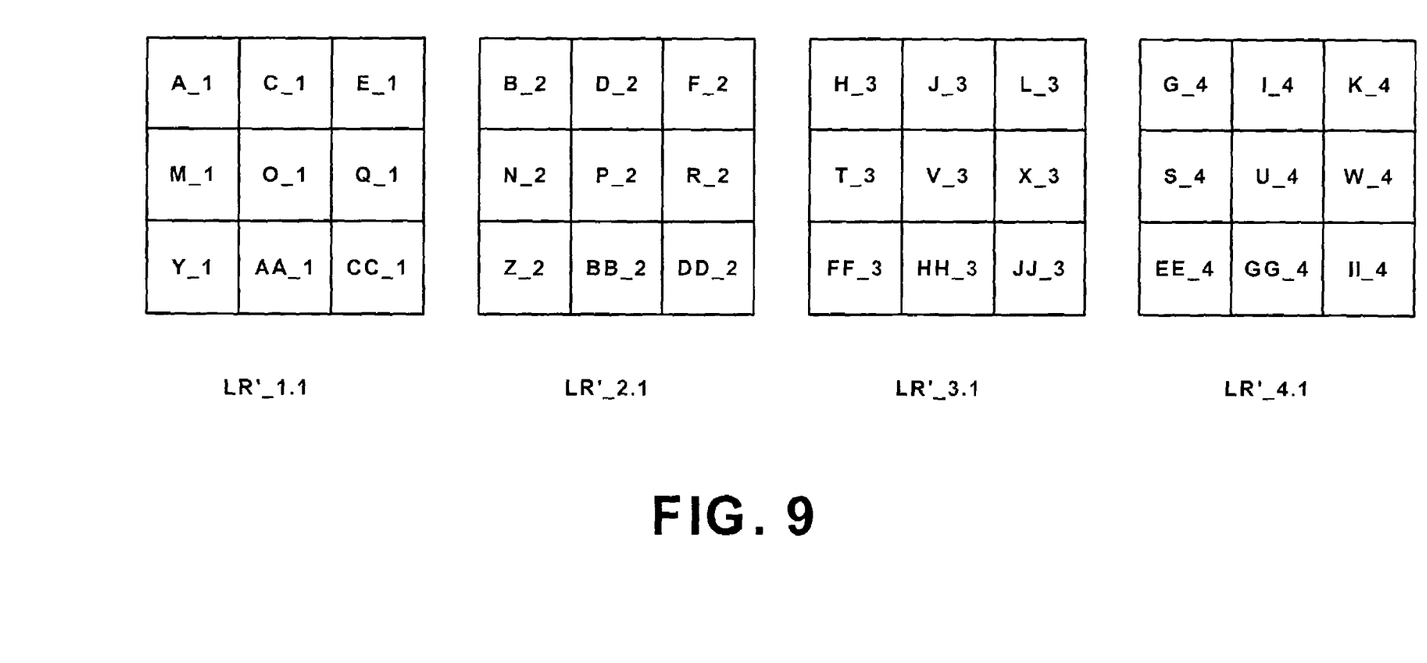
FIG. 9 is a block diagram depicting an alternative embodiment to the sequence of lower-resolution frames depicted in FIG. 7.

FIG. 9 is a block diagram depicting an alternative embodiment to the sequence of lower-resolution frames depicted in FIG. 7. The sequence of lower-resolution frames LR'_1.1, LR'_2.1, LR'_3.1, LR'_4.1 each contains nine pixels, whereas the sequence of lower-resolution frames LR'_1, . . . , and LR'_9 each contain four pixels. Therefore, it can be seen that an embodiment of the invention may be used to obtain lower-resolution frames at any of a plurality of desired resolutions.

Figure 10:
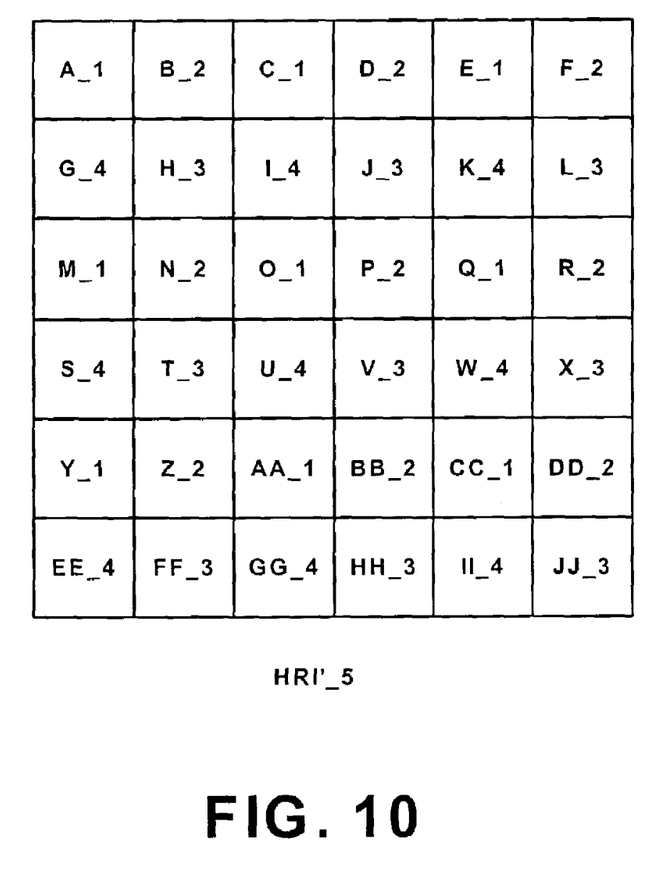
FIG. 10 is a block diagram depicting a higher-resolution image that is constructed using the lower-resolution frames depicted in FIG. 9.

FIG. 10 is a block diagram depicting a higher-resolution image HRI'_5 that is constructed using the lower-resolution frames depicted in FIG. 9. The higher-resolution image HRI'_5 may be constructed by vertically and horizontally interlacing the lower-resolution frames LR'_1.1, LR'_2.1, LR'_3.1, and LR'_4.1 (FIG. 9). Although the pixels used in constructing the image HRI'_5 originate from different lower-resolution frames than those used in constructing the image HRI'_10 (FIG. 8), both images may appear to be similar, if not identical. The degree of similarity between the images HRI'_5 and HRI'_10 depends on the frame rate and/or content of the higher-resolution frames HR'_1, . . . , HR'_9 (FIG. 6).

Figure 11:
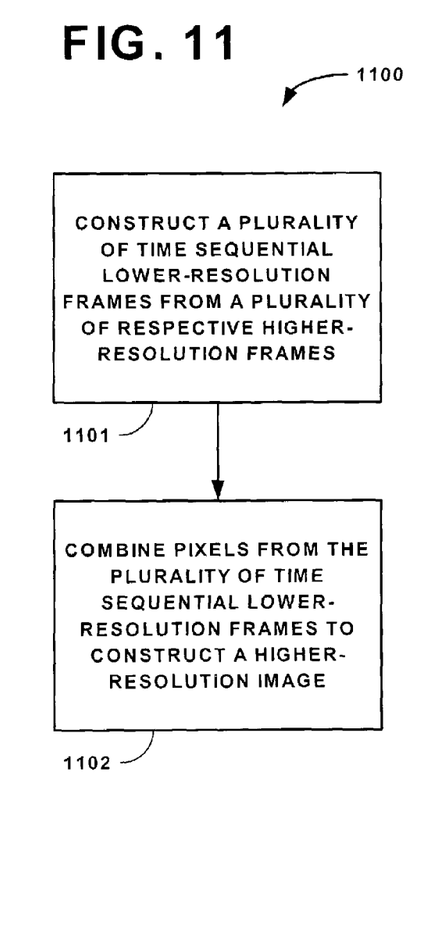
FIG. 11 is a flow chart depicting an embodiment of a method for constructing an image.

FIG. 11 is a flow chart depicting a method 1100 according to an embodiment of the present invention. In step 1101, a plurality of time-sequential higher-resolution frames are used to construct a plurality of respective lower-resolution frames. Step 1101 is preferably achieved by down-sampling the higher-resolution frames. The inter-frame location of each pixel selected from each higher-resolution frame is adjacent (vertically, horizontally, or diagonally) to the inter-frame location of a pixel selected from an adjacent higher-resolution frame. For example, if each higher-resolution frame is modeled as a matrix having rows and columns of pixels, then if a pixel located at row 1, column 1 (1,1) of a first higher-resolution frame is sampled (i.e., included in a corresponding lower-resolution frame), then one of the pixels that is sampled from an adjacent frame may be located at (1,2), (2,1), or (2,2). The down-sampling scheme used is preferably cyclical. For example, a pixel located at (1,1) may be sampled from every fourth time-sequential high-resolution frame (e.g., HR_1, HR_5, HR_9, HR_13, etc.).

After the plurality of lower-resolution frames are constructed from the plurality of higher-resolution frames, pixels from a subset of the lower-resolution frames may be combined to form a higher-resolution image, as indicated in step 1102. In one embodiment, pixels from each of four adjacent lower-resolution frames are vertically and horizontally interlaced to form the higher resolution image.

Figure 12:
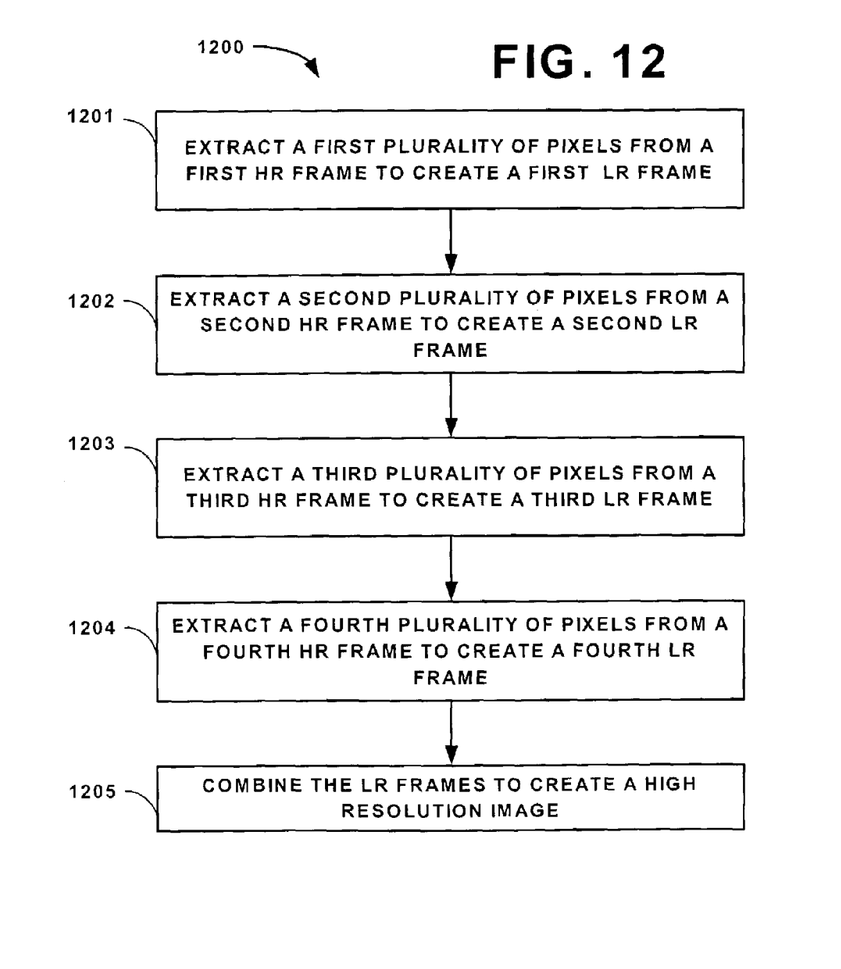
FIG. 12 is a flow chart depicting an embodiment of a method for constructing an image.

FIG. 12 is a flow chart depicting a method 1200 according to an embodiment of the present invention. In step 1201, a first plurality of pixels from a first higher-resolution frame HR_1 are extracted to create a first lower-resolution frame LR_1. The first higher-resolution frame HR_1 may be modeled as a first plurality of blocks of pixels. Based on this model, one pixel may be extracted from each of the first plurality of blocks to create the first lower-resolution frame LR_1.

In step 1202, a second plurality of pixels from a second higher-resolution frame HR_2 are extracted to create a second lower-resolution frame LR_2. The second higher-resolution frame HR_2 may be modeled as a second plurality of blocks of pixels, where each of the second plurality of blocks has a size and inter-frame location that are identical to a size and inter-frame location, respectively, of a corresponding block in the first plurality of blocks. Based on this model, one pixel may be extracted from each of the second plurality of blocks to create the second lower-resolution frame LR_2. Each pixel that is extracted from one of the second plurality of blocks has a different inter-frame location (relative to a higher-resolution frame HR) than a pixel that is extracted from a corresponding block in the first plurality of blocks.

In step 1203, a third plurality of pixels from a third higher-resolution frame HR_3 are extracted to create a third lower-resolution frame LR_3. The third higher-resolution frame HR_3 may be modeled as a third plurality of blocks of pixels, where each of the third plurality of blocks has a size and inter-frame location that are identical to the size and inter-frame location, respectively, of corresponding blocks in the first and second plurality of blocks. Based on this model, one pixel may be extracted from each of the third plurality of blocks to create the third lower-resolution frame LR_3. Each pixel that is extracted from one of the third plurality of blocks has a different inter-frame location (relative to a higher-resolution frame HR) than pixels that are extracted from corresponding blocks in the first and second plurality of blocks.

In step 1204, a fourth plurality of pixels from a fourth higher-resolution frame HR_4 are extracted to create a fourth lower-resolution frame LR_4. The fourth higher-resolution frame HR_4 may be modeled as a fourth plurality of blocks of pixels, where each of the fourth plurality of blocks has a size and inter-frame location that are identical to the size and inter-frame location, respectively, of corresponding blocks in the first, second, and third plurality of blocks. Based on this model, one pixel may be extracted from each of the fourth plurality of blocks to create the fourth lower-resolution frame LR_4. Each pixel that is extracted from one of the fourth plurality of blocks has a different inter-frame location (relative to a higher-resolution frame HR) than pixels that are extracted from corresponding blocks in the first, second, and third plurality of blocks.

Finally, in step 1205, the lower-resolution frames LR_1, LR_2, LR_3, and LR_4 are combined to create a higher-resolution image HRI. The lower-resolution frames LR_1, LR_2, LR_3, and LR_4 may be combined such that each pixel from the lower resolution frames is placed within the image HRI at an inter-frame location that is identical to the pixel's original inter-frame location within a high resolution frame HR.

Figure 13:
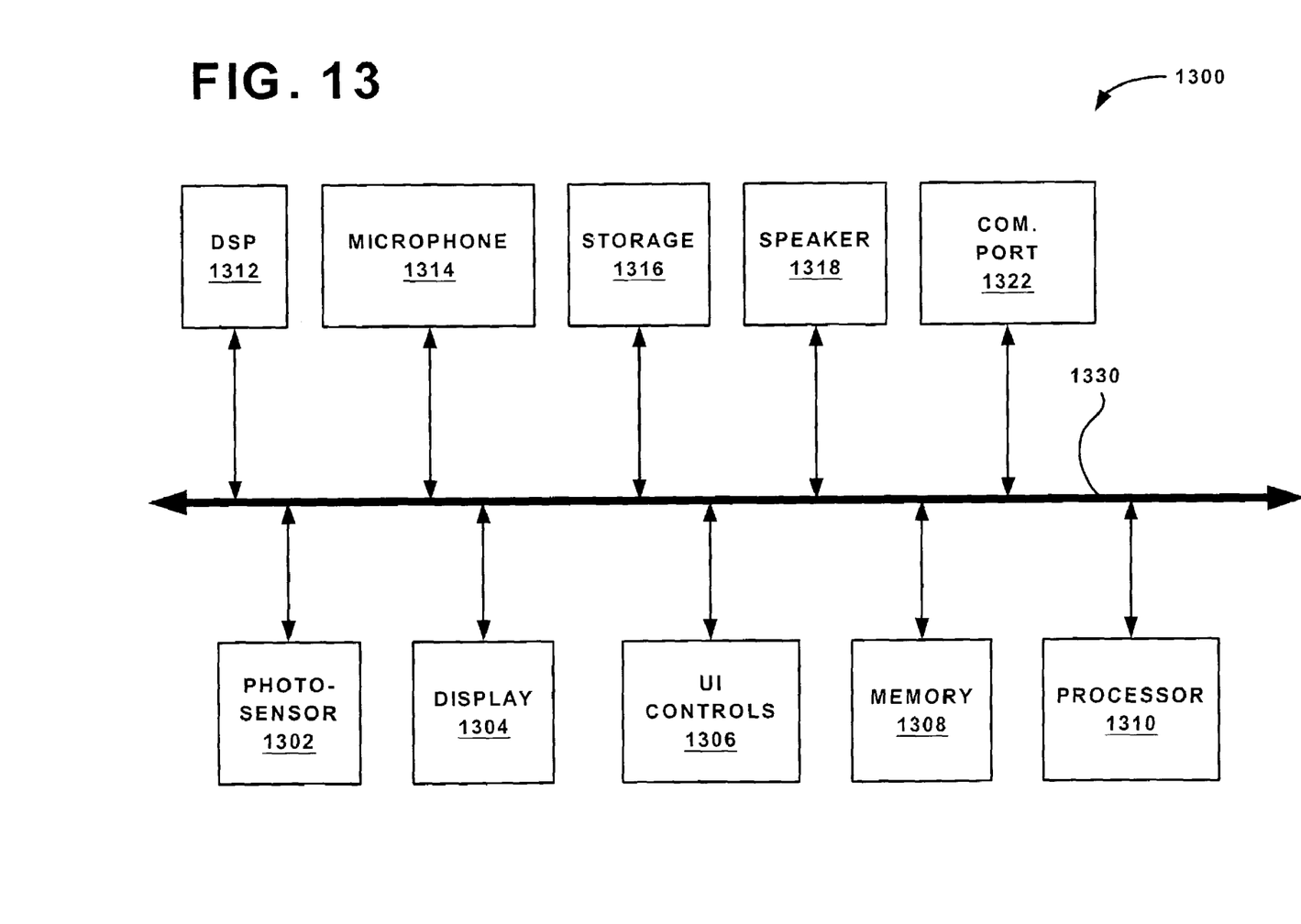
FIG. 13 is a block diagram depicting a digital camera according to an embodiment of the invention.

FIG. 13 is a block diagram depicting a digital camera 1300 according to an embodiment of the invention. The digital camera 1300 includes a photo-sensor 1302 for capturing images, a digital signal processor DSP 1312 for manipulating images, a display area 1304 for displaying images, a storage device 1316 for storing image data, memory 1308 for storing firmware, a processor 1310 for executing firmware stored in the memory 1308, user interface (UI) controls 1306 for receiving user input, and one or more communication ports 1322 for outputting image data to another device.

Each communication port 1322 may comprise, for example, a serial port, a parallel port, a Small Computer System Interface (SCSI), an infra-red IR interface, a wireless radio frequency (RF) interface, or a universal serial bus (USB) interface. The UI controls 1306 may include physical controls such as, for example, buttons, rocker switches, and/or a key pad for receiving user input. Furthermore, the display area 1304 may be touch-sensitive, and may thus display virtual controls for receiving user input. The digital camera may optionally include a microphone 1314 for receiving sound that is to be recorded in conjunction with captured images, and a speaker 1318 for outputting recorded sounds.

The digital images, video clips, and/or audio clips captured by the digital camera may be stored in the storage device 1316. The memory 1308 may be used for temporarily storing a captured image during its manipulation by the DSP 1312 or the processor 1310. The memory 1308 may comprise volatile memory (e.g., a type of random access memory (RAM)) for providing fast access to stored data. The storage device 1316, on the other hand, may comprise a non-volatile storage medium (e.g., a hard disk or a magnetic tape) that is suitable for providing long-term storage.

The above-mentioned components of the digital camera 1300 may be communicatively coupled via a local interface 1330, which may comprise, for example, one or more buses or other wired or wireless connections. The local interface 1330 may include additional elements, which are omitted for simplicity, such as, for example, controllers, buffers, drivers, repeaters, and/or receivers, to enable data transfer and communications between components of the digital camera 1300.

When the digital camera 1300 is in operation, it captures higher-resolution image data via the photo-sensor 1302. The higher-resolution image data is temporarily stored in memory 1308 as the processor 1310 converts the higher-resolution image data into lower-resolution image data using methodology described above. The processor 1310 performs such conversion by executing program code contained in memory 1308. The lower resolution image data is then stored in storage device 1316 and displayed as a video stream via the display area 1304. The higher-resolution image data may alternatively be converted into lower-resolution image data using an application specific integrated circuit (ASIC).

A user may provide input via the UI controls 1306 requesting that a certain image (e.g., as shown by the display area 1304) be printed. In response to such user input, the processor 1310 uses image data corresponding to a plurality of lower-resolution images to produce higher-resolution image data using a methodology described above. The higher-resolution image data is then communicated to a printing device (not shown). The printing device may be a stand alone unit or may be integrated into the digital camera 1300. The printing device then uses the higher-resolution image data to print a higher-resolution image.

Figure 14:
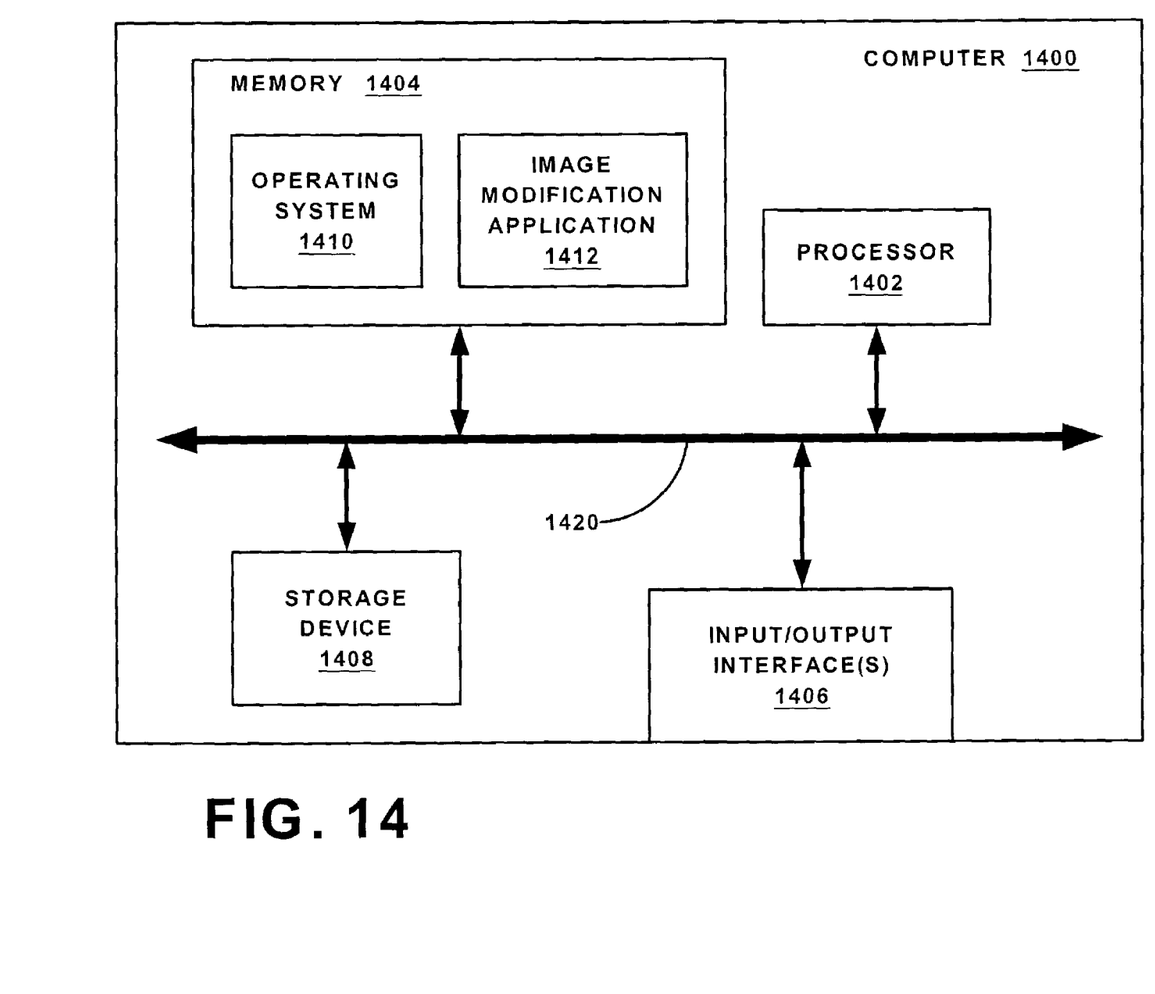
FIG. 14 is a block diagram depicting a computer according to an embodiment of the invention.

A user may also provide input via the UI controls 1306 requesting that a lower-resolution image stream be transferred to a computer 1400 (FIG. 14). In response to such user input, the processor 1310 transfers the lower-resolution image stream from the storage device 1316 to the computer 1400 via the communication port 1322. The computer 1400 is configured to use the lower-resolution image stream to re-construct higher-resolution images.

FIG. 14 is a block diagram depicting a computer 1400 according to an embodiment of the invention. The computer 1400 may be, for example, a desktop computer (e.g., IBM-compatible, Apple-compatible, or otherwise), a notebook computer, a workstation, a minicomputer, a personal digital assistant (PDA), or a mainframe computer, among others.

Generally, in terms of hardware architecture, as shown in FIG. 14, the components of the computer 1400 include a processor 1402, memory 1404, input/output (I/O) interfaces 1406, and a storage device 1408. These components (602, 1404, 1406, and 1408) may be communicatively coupled via a local interface 1420, which may comprise, for example, one or more buses or other wired or wireless connections. The local interface 1420 may have additional elements, which are omitted for simplicity, such as controllers, buffers (caches), drivers, repeaters, and receivers, to enable communications.

The processor 1402 is a hardware device for executing software, particularly that stored in memory 1404. The processor 1402 can be any custom made or commercially available processor, a central processing unit (CPU), an auxiliary processor among several processors associated with the computer 1400, a semiconductor based microprocessor (in the form of a microchip or chip set), or generally any device for executing software instructions. When the computer 1400 is in operation, the processor 1402 is configured to execute software stored within the memory 1404, to communicate data to and from the memory 1404, and to generally control operations of the computer 1400 pursuant to the software.

The I/O interfaces 1406 may be used to communicate with one or more peripheral devices including, for example, a printer, a copier, a keyboard, a mouse, and/or a monitor, etc. The I/O interfaces 1406 may include, for example, a serial port, a parallel port, a Small Computer System Interface (SCSI), an IR interface, an RF interface, and/or a universal serial bus (USB) interface.

The memory 1404 can include any one or combination of volatile and/or non-volatile memory elements now known or later developed. For example, the memory 1404 may comprise random access memory (RAM), read only memory (ROM), a hard disk, a tape, and/or a compact disk ROM (CD-ROM), among others. Note that the memory 1404 can have a distributed architecture, where various components are situated remote from one another, but can be accessed by the processor 1402.

The storage device 1408 can be used for storing higher-resolution frames, corresponding lower-resolution frames, and/or reconstructed higher-resolution images. The higher resolution frames and/or the lower resolution frames may be imported from a digital imaging device, such as, for example, the digital camera 1300 (FIG. 13). The storage device 1408 may comprise nonvolatile memory, such as, for example, a hard disk. Higher-resolution frames may be moved from the storage device 1408 to the memory 1404 prior to being converted to lower-resolution frames, which can then be stored in the storage device 1408 and/or output to a monitor (not shown) via one of the I/O interface 1406. Furthermore, lower-resolution frames may be moved from the storage device 1408 to the memory 1404 prior to being used to reconstruct a higher-resolution image. A reconstructed higher-resolution image can then be output to a monitor and/or a printer (not shown) via the I/O interfaces 1406.

The software applications in memory 1404 include an operating system (OS) 1410 and an image modification application 1412. The OS 1410 essentially controls the execution of the other applications, and provides scheduling, input-output control, file and data management, memory management, and/or communication control, among other functionality. The image modification application 1412 may be used to convert higher-resolution frames into corresponding lower-resolution frames and/or to reconstruct a higher-resolution image from lower-resolution frames using methodology described above. The image modification application 1412 may be a source program, an executable program (e.g., object code), a script, or any other entity comprising a set of instructions to be executed.

The image modification application 1412 can be embodied in any computer-readable medium for use by or in connection with an instruction execution system, apparatus, or device, such as a computer-based system or a processor-containing system. In the context of this disclosure, a "computer-readable medium" can be any means that can store, communicate, propagate, or transport a program for use by or in connection with the instruction execution system, apparatus, or device. The computer-readable medium can be, for example, among others, an electronic, magnetic, optical, electromagnetic, infrared, or semiconductor system, apparatus, device, or propagation medium now known or later developed.

What is claimed is:

1. A method comprising:

constructing a second plurality of time-sequential frames having a second resolution from a first plurality of time-sequential frames having a first resolution, wherein each of the frames of the second plurality of frames constitutes a subset of pixels of a corresponding frame from the first plurality of frames, wherein the combination of all the subsets of pixels corresponding to all the frames of the second plurality of frames comprises a plurality of pixels from each row of pixels of the first plurality of time-sequential frames and a plurality of pixels from each column of pixels of the first plurality of time-sequential frames, and wherein the second resolution being lower than the first resolution and at most one frame of the second plurality of frames is constructed from each of the first plurality of frames; and constructing an image from the second plurality of time sequential frames, the image having a resolution that is higher than the second resolution.

2. The method of claim 1, wherein the method is implemented by one of a computer or a digital camera.

3. The method of claim 1, wherein the resolution of the image is equal to the first resolution.

4. The method of claim 1, wherein a total number of pixels in each of the second plurality of time-sequential frames is equal to one fourth of a total number of pixels in a corresponding frame from the first plurality of time-sequential frames.

5. The method of claim 1, further comprising:

outputting the image to a device that is configured to render the image.

6. The method of claim 5, wherein the device is one of a monitor or a printer.

7. The method of claim 1, wherein the first resolution is equal to four times the second resolution.

8. The method of claim 5, wherein using the second plurality of time sequential frames to construct the image comprises interlacing pixels from each frame of the second plurality of time-sequential frames with pixels from each other frame of the second plurality of time-sequential frames.

9. A system comprising:

memory for storing a first plurality of pixel values corresponding to a plurality of respective time-sequential frames; and a processor that is programmed to use the first plurality of pixel values to generate a second plurality of pixel values corresponding to an image having a greater resolution than any of the plurality of time-sequential frames, wherein each of the plurality of respective time-sequential frames constitutes a subset of pixels of a corresponding frame containing the image, wherein the combination of all the subsets of pixels of all the frames of the respective time-sequential frames comprises a plurality of pixels from each row of pixels of the corresponding frame and a plurality of pixels from each column of the corresponding frame and at most one frame of the plurality of respective time-sequential frames is generated from a corresponding frame of a first plurality of frames.

10. The system of claim 9, wherein the system comprises one of a computer or a digital camera.

11. The system of claim 9, wherein the resolution of the image is equal to four times the resolution of one of the plurality of time-sequential frames.

12. The system of claim 9, wherein the image is generated by interlacing pixels from each frame of the plurality of time-sequential frames with pixels from each other frame of the plurality of time-sequential frames.

13. The system of claim 9, wherein a total number of pixels in each of the plurality of time-sequential frames is equal to one fourth of a total number of pixels in the image.

14. A computer-readable medium having stored thereon a computer executable instruction set configured to direct a processor to perform a method comprising:

constructing a second plurality of time-sequential frames having a second resolution from a first plurality of time-sequential frames having a first resolution, wherein each of the frames of the second plurality of frames constitutes a subset of pixels of a corresponding frame from the first plurality of frames and the second resolution being lower than the first resolution, wherein the combination of all the subsets of pixels of all the frames of the second plurality of frames comprises a plurality of pixels from each row of pixels of a corresponding time-sequential frame and a plurality of pixels from each column of pixels of the corresponding time-sequential frame and at most one frame of the second plurality of frames is constructed from each of the first plurality of frames; and constructing an image from the second plurality of time sequential frames, the image having a resolution that is higher than the second resolution.

15. A system comprising:

means for constructing a second plurality of time-sequential frames having a second resolution from a first plurality of time-sequential frames having a first resolution, wherein each of the frames of the second plurality of frames constitutes a subset of pixels of a corresponding frame from the first plurality of frames, wherein the combination of all the subsets of pixels of all the frames of the second plurality of frames comprises a plurality of pixels from each row of pixels of the first plurality of time-sequential frames and a plurality of pixels from each column of pixels of the first plurality of time-sequential frames, and wherein the second resolution being lower than the first resolution and at most one frame of the second plurality of frames is constructed from each of the first plurality of frames; and means for constructing an image from the second plurality of time sequential frames, the image having a resolution that is higher than the second resolution.

* * * * *

UNITED STATES PATENT AND TRADEMARK OFFICE
CERTIFICATE OF CORRECTION

PATENT NO. : 7,382,937 B2 Page 1 of 1
APPLICATION NO. : 10/383330
DATED : June 3, 2008
INVENTOR(S) : Casey L. Miller et al.

It is certified that error appears in the above-identified patent and that said Letters Patent is hereby corrected as shown below:

In column 3, line 65, after "respectively" insert -- (within a --.

In column 4, line 37, delete "$B\_{b\,1}$" and insert -- $B\_1$ --, therefor.

Signed and Sealed this

Twelfth Day of May, 2009

JOHN DOLL
*Acting Director of the United States Patent and Trademark Office*